United States Patent
Ruehrig et al.

(10) Patent No.: US 7,490,522 B2
(45) Date of Patent: Feb. 17, 2009

(54) MAGNETOSTRICTIVE MULTILAYER SENSOR AND METHOD FOR PRODUCING A SENSOR

(75) Inventors: Manfred Ruehrig, Eckental (DE); Stephan Schmitt, Munich (DE); Juergen Zimmer, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/620,304

(22) Filed: Jan. 5, 2007

(65) Prior Publication Data

US 2007/0186666 A1     Aug. 16, 2007

Related U.S. Application Data

(63) Continuation of application No. PCT/EP2005/007262, filed on Jul. 5, 2005.

(30) Foreign Application Priority Data

Jul. 5, 2004     (DE) .................. 10 2004 032 484

(51) Int. Cl.
*G01L 3/02* (2006.01)
(52) U.S. Cl. ................................. 73/862.335
(58) Field of Classification Search ............... 73/779, 73/862.331–862.335
See application file for complete search history.

(56) References Cited

U.S. PATENT DOCUMENTS

| | | | |
|---|---|---|---|
| 4,173,900 A | 11/1979 | Tanabe et al. | 73/727 |
| 4,217,705 A | 8/1980 | Ito et al. | 73/720 |
| 4,522,067 A | 6/1985 | Burger et al. | 73/862.65 |
| 4,620,365 A | 11/1986 | Burger et al. | 29/610 |
| 4,782,705 A | 11/1988 | Hoffmann et al. | 73/776 |
| 4,884,453 A | 12/1989 | Hoffmann et al. | 73/776 |
| 5,107,710 A | 4/1992 | Huck et al. | 73/708 |
| 5,168,760 A * | 12/1992 | Wun-Fogle et al. | 73/779 |
| 5,588,466 A * | 12/1996 | Benz et al. | 137/831 |
| 5,739,990 A | 4/1998 | Ravipati et al. | 360/113 |
| 5,856,617 A | 1/1999 | Gurney et al. | 73/105 |
| 6,121,611 A * | 9/2000 | Lindsay et al. | 250/306 |

(Continued)

FOREIGN PATENT DOCUMENTS

DE     2809549 A1     10/1978

(Continued)

OTHER PUBLICATIONS

Lohndorf et al. "Highly Sensitive Strain Sensors Based on Magnetic Tunneling Junctions" Applied Physics Letters, vol. 81 (pp. 313-315), Jul. 8, 2002.

(Continued)

*Primary Examiner*—Max Noori
(74) *Attorney, Agent, or Firm*—Eschweiler & Associates, LLC

(57) ABSTRACT

A sensor has a substrate in which a mechanically deformable area is formed. A first magnetostrictive multilayer sensor element and a second magnetostrictive multilayer sensor element are formed in the mechanically deformable area, wherein the first magnetostrictive multilayer sensor element and the second magnetostrictive multilayer sensor element are connected to each other and implemented such that when generating a mechanical deformation of the mechanically deformable area, the electric resistance of the first magnetostrictive multilayer sensor element changes in an opposite way to the electric resistance of the second magnetostrictive multilayer sensor element, or the electric resistance of the first magnetostrictive multilayer sensor element remains unchanged.

24 Claims, 6 Drawing Sheets

U.S. PATENT DOCUMENTS

| | | | |
|---|---|---|---|
| 6,396,262 B2 * | 5/2002 | Light et al. | 324/240 |
| 6,507,187 B1 * | 1/2003 | Olivas et al. | 324/207.21 |
| 6,595,065 B2 | 7/2003 | Tanizawa et al. | 73/720 |
| 7,045,224 B2 * | 5/2006 | Hasegawa et al. | 428/811.5 |
| 7,250,839 B2 * | 7/2007 | Racz et al. | 335/215 |
| 7,319,322 B2 * | 1/2008 | Schmitt et al. | 324/252 |
| 2004/0050172 A1 | 3/2004 | Quandt et al. | 73/779 |

FOREIGN PATENT DOCUMENTS

| | | |
|---|---|---|
| DE | 3113745 A1 | 10/1982 |
| DE | 3502008 A1 | 7/1986 |
| DE | 4000326 A1 | 7/1991 |
| DE | 19833712 A1 | 1/1999 |
| DE | 19825761 C2 | 2/2001 |
| DE | 19949714 A1 | 4/2001 |
| DE | 69704536 T2 | 8/2001 |
| DE | 10214946 A1 | 10/2003 |
| DE | 10250358 A1 | 5/2004 |
| WO | 95/28649 | 10/1995 |
| WO | 02/052235 A1 | 7/2002 |
| WO | 2006/002988 A1 | 1/2006 |

OTHER PUBLICATIONS

Lohndorf et al. "Strain Sensors Based on Magnetostrictive GMR/TMR Structures" IEEE Transactions on Magnetics, vol. 38, No. 5 (pp. 2826-2828), Sep. 2002.

Ludwig et al. "Adapting GMR Sensors for Integrated Devices" Elsevier Science (pp. 15-18), 2003.

International Search Report and Written Opinion for International Application No. PCT/EP2005/007262 (12 pages), Nov. 10, 2005.

English Translation of German Patent No. DE 198 25 761 C2 (pp. 1-20), Feb. 19, 2007.

English Translation of German Patent No. DE 102 50 358 A1 (pp. 1-11), Feb. 20, 2007.

* cited by examiner

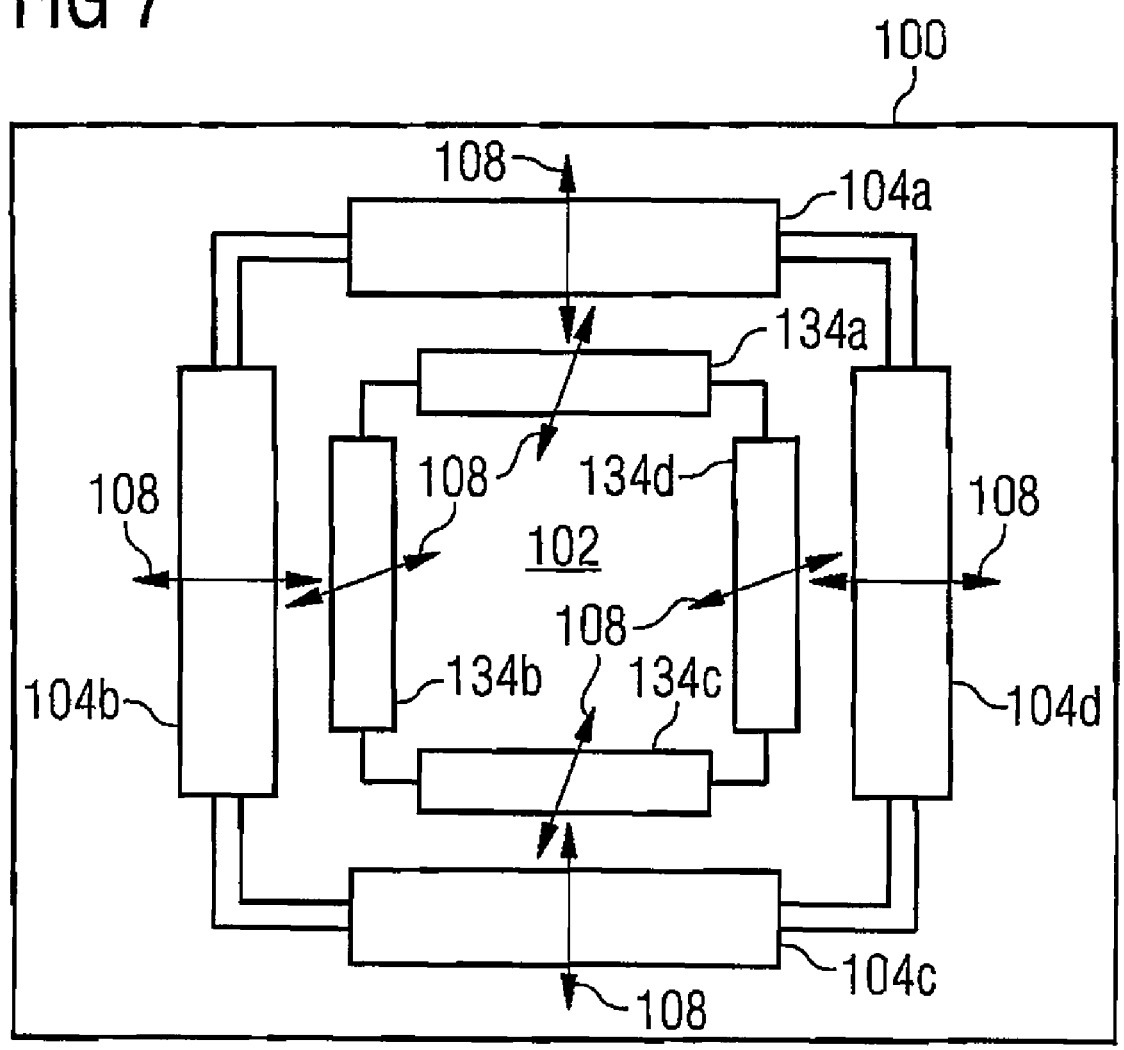

MAGNETOSTRICTIVE MULTILAYER SENSOR AND METHOD FOR PRODUCING A SENSOR

RELATED APPLICATION

This application is a continuation of International Application No. PCT/EP2005/007262 filed Jul. 5, 2005, which designates the United States, and claims priority to German application number DE 10 2004 032 484.0 filed Jul. 5, 2004.

TECHNICAL FIELD

The present invention relates to magnetostrictive multilayer sensors for detecting mechanical deformation.

BACKGROUND

Nowadays, magnetostrictive multilayer systems, such as spin-valve systems, are used in a plurality of applications. One field of application that has increased in importance recently comprises the usage of magnetostrictive GMR/TMR resistor structures as pressure sensors.

Pressure sensors operate generally according to the principle of deflection of moveable membranes or other moveable elements, by pressure impact, wherein the membrane deflection represents a measure for the applied pressure. Thereby, the membranes of the pressure sensors can be realized in silicon technology via bulk micromechanic (BMM) or in surface micromechanic (SMM). Pressure sensors in surface micromechanic measure, for example, a change of capacitance between membrane and substrate against electrode induced by the membrane deflection. Thereby, the capacitance swings are so small, that significant effort has to be made in signal processing, which results in an increased chip area. Further, the increased signal processing effort leads to additional cost increase of production, since additional effort is required for realizing the corresponding circuits.

In pressure sensors in BMM technology, membrane deflection is detected via the piezoresistive effect, wherein the expansion of the membrane is evaluated via expansion-induced change of resistance, for example at certain doped areas. However, the so-called gauge factor, which corresponds to quotients dR/R/expansion, i.e., which is a measure for sensitivity, is only small for silicon with about 40, which results in a reduced signal noise ratio.

Due to its higher gauge factor, which can be up to about 600 for a TMR structure, the approach of GMR/TMR resistor structures promises in comparison to the piezoresistive effect, improved sensitivity, higher signal/noise ratio as well as pressure measurement with increased resolution.

However, in many applications it is required to connect two or more such sensor elements to a bridge arrangement, for example a Wheatstone bridge, to obtain a signal indicating the generated expansion or the applied pressure, respectively.

Normally, for realizing a sensor bridge, a full bridge is used, wherein the signal, i.e. a change of resistance, is oppositely rectified in both branches. Normally, this is obtained by oppositely magnetizing the reference layer, which requires additional effort, for example by requiring meandering conductive trace foil. The additional effort also increases the production cost of the sensors, where it would be desirable to provide a sensor with lower production cost, due to the numerous applications for which pressure sensors are suitable, and due to the fierce competition.

General basics of multilayer sensors can be found in the references Löhndorf et al "Highly sensitive strain sensors on magnetic tunneling junctions", Appl. Phys. Lett., Vol. 81, pp. 313-315, Löhndorf et. al. Strain sensors based on magnetostrictive GMR/TMR structures", IEEE Trans. Magn, Vol. 28, pp. 2826-2828, September 2002, Ludwig et al, "Adapting GMR sensors for integrated devices", Sensors and Actuators A, 106, pp. 15-18, 2003.

SUMMARY

According to an embodiment, a sensor may comprise: a substrate; a mechanically deformable area formed in the substrate; and a first magnetostrictive multilayer sensor element and a second magnetostrictive multilayer sensor element, each arranged at least partly in the mechanically deformable area, wherein the first magnetostrictive multilayer sensor element and the second magnetostrictive multilayer sensor element are connected to each other and implemented such that when generating a mechanical deformation of the mechanically deformable area, the electric resistance of the first magnetostrictive multilayer sensor element changes in opposition to the electric resistance of the second magnetostrictive multilayer sensor element, or the electric resistance of the first magnetostrictive multilayer sensor element remains unchanged, wherein the first and second magnetostrictive multilayer sensor elements are spin-valve sensor elements and a magnetization of the magnetically hard layer of the first sensor element and the second sensor element have the same direction.

BRIEF DESCRIPTION OF THE DRAWINGS

These and other objects and features of the present invention will become clear from the following description taken in conjunction with the accompanying drawings, in which:

FIG. 2b is a circuit diagram of the sensor illustrated in FIG. 2a;

FIG. 3b is a circuit diagram of the sensor according to FIG. 3a;

FIG. 7 is a schematic top view on a sensor according to a further embodiment.

DETAILED DESCRIPTION

Figure 1A:
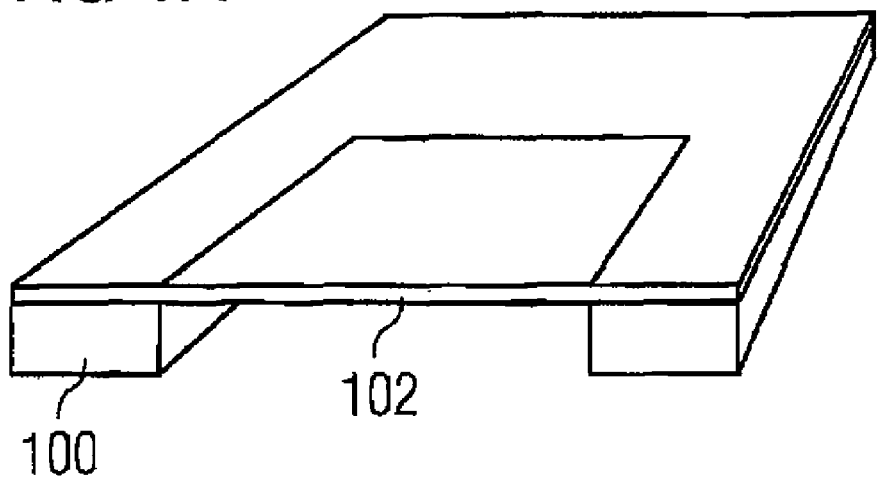
FIG. 1 is a schematic perspective cross-sectional illustration of a membrane according to an embodiment.
Figure 1B:
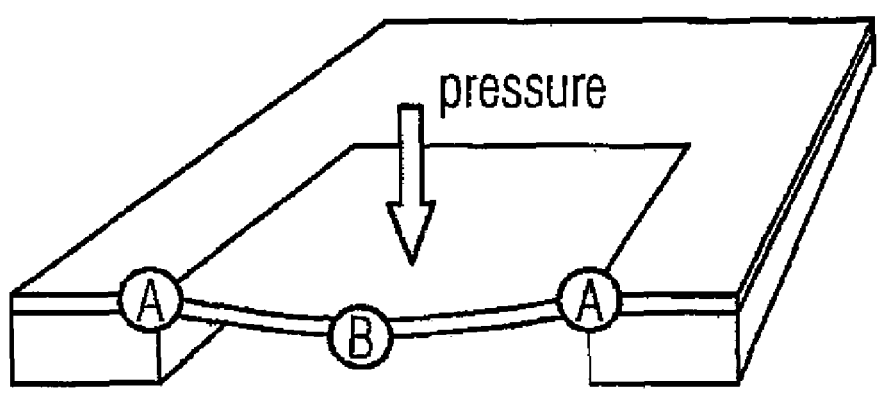

According to another embodiment, a method for producing a sensor may have the steps of: generating a mechanically deformable area in a substrate; generating a first magnetostrictive multilayer sensor element and a second magnetostrictive multilayer sensor element, each at least partly in the mechanically deformable area, wherein the same are implemented such that when generating a mechanical deformation of the of the mechanically deformable area, the electric resistance of the first magnetostrictive multilayer sensor element changes in opposition to the electric resistance of the second magnetostrictive multilayer sensor element, or the electric resistance of the first magnetostrictive multilayer sensor element remains unchanged, wherein the first and second magnetostrictive multilayer sensor elements are spin-valve sensor elements and a magnetization of the magnetically hard layer of the first sensor element and the second sensor element have the same direction; and connecting the first magnetostrictive multilayer sensor element and the second magnetostrictive multilayer sensor element.

The present invention is based on the knowledge that it is possible to obtain an output signal having improved characteristics in a simple and cost effective way by a simple arrangement of magnetostrictive multilayer sensor elements for detecting a deformation of a mechanically deformable area under consideration of the expansion directions imparted to the elements and by connecting the sensor elements. Thereby, the arrangement of the sensor elements is merely determined based on a deformation occurring at the location of the sensors when using the sensor, particularly a direction of the deformation, i.e. a characteristic of the deformable area at the location of the sensors, as well as the magnetization of the sensor elements.

Generally, a magnetostrictive multilayer sensor element means a sensor element consisting of at least two magnetic layers arranged on top of each other, and shows a magnetostrictive effect, i.e. a change of the resistor by positive expansion or negative expansion (striction). In some embodiments, such sensor elements can comprise, for example, GMR structures (giant magneto resistance) or TMR structures (tunneling magneto resistance). Particularly in some embodiments, so-called spin-valve structures are suitable as GMR/TMR elements, which consist of two magnetic layers, which are separated from each other by a non-magnetic layer. Thereby, the layer resistance of the structure depends on the relative angle between the magnetization directions of the two magnetic layers. One of the magnetic layers, which is referred to as magnetically hard layer or reference layer, is fixed with regard to magnetization, i.e. pinned, while the other magnetic layer, which is referred to as magnetically soft layer or measurement layer, respectively, can rotate its magnetization direction by an external magnetic field and/or stress/expansion, which correlates with a change of the layer resistance. If both magnetizations are parallel, the layer resistance is minimum, while the layer resistance is maximum in an antiparallel alignment. The resistor is proportional to cos ($\Phi$), wherein $\Phi$ is the angle between both magnetizations. At room temperature, the resistance swing of parallel to antiparallel configuration covers typically approximately 10% for GMR systems and approximately 50% of the basic resistor for TMR systems.

The usage of these sensor elements for detecting mechanical deformation may require that at least a partial area of the respective sensor elements is arranged in an area of the mechanically deformable area to be detected. According to an embodiment, the arrangement on the deformable area is chosen corresponding to the respective usage of the sensor elements, for example whether the sensor elements are to be arranged in a full bridge or a half bridge, as will be discussed in more detail below.

According to an embodiment, the sensor elements can be implemented as CIP elements (current in plane elements), where the current runs in parallel to the layer planes, or as CPP elements (current perpendicular to plane elements), where the current flows perpendicular to the layer plane.

According to an embodiment, it can be particularly advantageous when the magnetizations of the magnetically soft layer or the magnetically hard layer of all sensor elements have a common predetermined direction, so that the magnetization of all sensor elements is possible with a single method step. Thereby, production cost can be reduced, which is particularly advantageous with regard to mass production of such sensors to be expected in future. According to an embodiment, it can be particularly advantageous to provide the same magnetization for all sensor elements, i.e. that all sensor elements have magnetization of the magnetically soft layer in a single predetermined direction, and the magnetizations of the magnetically hard layers point to a second predetermined direction for the respective sensor elements.

According to an embodiment, depending on the usage and other requirements, different arrangements and connections can be chosen, to thereby obtain a detector with improved characteristics of the output signal by appropriately tapping a detector signal.

More precisely, in one embodiment, a first magnetostrictive multilayer sensor element and a second magnetostrictive multilayer sensor element are arranged such that when generating a mechanical deformation of the mechanically deformable area, the electric resistance of the first sensor element remains unaltered, while the electric resistance of the second sensor element changes. The embodiment, where a sensor element is arranged such that no change of the resistance with a deformation results, has the advantage that the same can be used as reference resistor, which is subject to the same conditions as a measurement resistor, i.e. the same pressure provisions and the same environmental conditions, for example same temperature. Thereby, a drift of the detector, which can, for example, be caused by varying temperature or varying mechanical load of the measurement and reference resistors, can be compensated in a simple way without additional circuit effort.

For example, for realizing a half bridge, it is required to arrange four single elements such that two elements increase or decrease their resistance in a deformation or pressure provision, respectively, i.e. act as measurement resistors, and two resistors remain constant, i.e. act as reference resistors. Since the sensor elements acting as reference resistor do not change the electric resistance in this embodiment, although the same are subject to the measurement load, i.e. for example the expansion of a deformable area, it can be effected that the reference resistors are subject to the same conditions as the measurement resistors. Thereby, a half bridge can be realized, where all four participating resistors experience the same expansion during operation, wherein, however, merely two change their resistance.

The expansions occurring during operation represent a material load, particularly for the TMR structures having an $Al_2O_3$ tunnel barrier in the range of several nm, which can cause a drift in the basic resistance over time. By the above-described arrangement, where one or several reference resistors remain constant in an expansion, it is allowed that all participating resistors, i.e. measurement resistors and reference resistors, experience the same expansion during operation, so that long-time drifts of the basic resistors due to material fatigue can be absorbed.

According to an embodiment, the above-described arrangement can be effected by a certain alignment of the magnetizations of the hard and soft layers with regard to the expansion directions transmitted from the membrane to the elements, which is adjustable via processing. According to an embodiment, for obtaining a sensor element, where no changes of the resistor occur, it is required that the magnetization of the magnetically soft layer is parallel to the expansion direction at the location of the sensor element, since the parallel alignment of the magnetization of the magnetically soft layer in parallel to the expansion direction is energetically most favorable for materials with positive magnetostrictive constants.

The magnetization of the soft layer is preferably oriented identically for all individual elements, which is automatically ensured in a described embodiment by the parallel alignment of the magnetically soft and magnetically hard layer with the magnetization process of the hard reference layer, e.g. by combining with an existing paramagnetic Neel coupling. In such an embodiment with parallel magnetizations of the magnetically hard and soft layers for all sensor elements, both magnetizations for the measurement resistors are preferably perpendicular, or for the reference resistors in parallel to the expansion directions at the location of the sensors. This can be particularly advantageous in a rectangular, preferably square implementation of the mechanically deformable area, since by a simple arrangement on the sides of the mechanically deformable area the above-mentioned advantage of simultaneous magnetization of all sensor elements, i.e. both the measurement and the reference sensor elements, becomes possible, wherein the magnetization of the magnetically soft layer of the measurement resistors is perpendicular to the expansion direction, as long as the measurement resistors and the reference resistors are arranged at adjacent sides, i.e. perpendicular edges. According to an embodiment, by the magnetic alignment of the soft and hard layer in parallel to each other, combined with a perpendicular configuration with regard to the expansion directions for the measurement resistors and a parallel configuration for the reference resistors, a maximum possible signal swing is enabled for a half bridge, wherein no locally different magnetization directions of the hard and soft layer are required. According to an embodiment, in this arrangement, the dependence of the deformation is used, which has the effect that the expansion directions at the edges of the rectangular deformable area are perpendicular to the edges.

Thus, in this embodiment, compared to a perpendicular orientation of the magnetically soft and hard layers, as is required, for example, in a full bridge, saving a terminating magnetization step for clear alignment of the magnetically soft sensor layer can be obtained. All individual elements can be magnetized in a step on wafer level, which is advantageous for process control as well as process cost.

In a further embodiment, the first sensor element and the second sensor element are arranged such that the first sensor element changes its resistance in opposition to the second sensor element, when the mechanically deformable area is deformed by external application of force or pressure.

This allows that the sensor elements can be connected in a full bridge, where for example two elements are arranged respectively in two branches, which change their resistance in opposition. By tapping a voltage signal between the sensor elements changing in opposition, within one branch, it is possible to provide a sensor signal with high sensitivity.

In one embodiment of a spin-valve sensor, the magnetizations of the sensor elements are such that the hard layer is magnetized below 45° or 135° with regard to the expansion directions, and the magnetization of the soft layer is oriented perpendicular to the hard layer. Thereby, again, cost-effective production results, since all individual elements can be magnetized in one step on wafer level, which has an advantageous effect on process control and process cost.

In one embodiment, it is intended that the magnetization direction of the magnetically soft layer, i.e. the measurement layer, has an angle of 45° to the magnetization of the reference layer, i.e. the magnetically hard layer. Thereby, the magnetization of the hard layer is preferably adjusted such that it is parallel or antiparallel to the expansion direction, so that the magnetization of the soft layer has an angle of 45° with regard to the expansion direction.

Further, in this embodiment, it is also possible that the magnetizations of all sensor elements point in the same direction, i.e. that all sensor elements have a magnetization of the magnetically soft layer in a single predetermined direction, and the magnetizations of the magnetically hard layers point in a second predetermined direction for the respective sensor elements.

It is the advantage of this embodiment that a deliberate connection of four nominally equal resistors to one bridge, i.e. a Wheatstone bridge, can obtain all known advantages, such as a compensation of offset drifts, whereby by arranging the magnetizations of the magnetically hard and magnetically soft layers below an angle of 45° it is obtained that a characteristic curve of the bridge signal across the voltage or the pressure, is symmetrical to the operating point, i.e. has a desired linearity of the characteristic curve.

Generally, without mechanic deformation of mechanically deformable area, the magnetization of the magnetically hard layer and the magnetization of the magnetically soft layer of the first sensor element and the second sensor element can be adjusted such that they have an angle of 0°, 45°, 90° or 135° or any intermediate angles between the above values.

Also, an angle between the expansion direction and the magnetization of the magnetically hard layer of the first sensor element and the second sensor element can be adjusted such that they have an angle of 0°, 45°, 90°, 135° or 180° or any intermediate angles between the above values.

Further, without mechanical deformation of the mechanically deformable area, an angle between the expansion direction and the magnetization of the magnetically soft layer of the first sensor element and the second sensor element can be adjusted such that they have an angle of 0°, 45°, 90° or 135° or any intermediate angles between the above values.

According to different embodiment, the implementation of the sensor elements can have a plurality of forms and implementations, depending on application and implementation of the mechanically deformable area. For example, in circular membranes, the resistors can be implemented in the form of circular segments, and can be connected correspondingly. This has the advantage of simple production and optimum usage of the available area of the membrane.

Above that, the unidirectional alignment of the reference resistors has the advantage that the sensor is relatively insensitive against small external magnetic fields, since the same would influence the magnetization in all bridge elements in the same way. Due to the equal alignment of the reference layer of all elements of the bridge, the influence on the bridge signal is minimized.

According to an embodiment, the resistors can be preferably arranged at the locations of maximum deformation, to obtain a sensor signal that is as high as possible, with a low noise signal. For example, when using the sensor as a pressure sensor, these locations are arranged with a membrane at the edges of the membrane.

Further, in one embodiment, it is possible that one or several sensor elements have a distance from a center or symmetry point of the mechanically deformable area, which is lower than the distance of one or several other sensor elements.

This arrangement of the sensor elements in different distances from a center or symmetry point of the mechanically deformable area allows that the sensor elements have different characteristic curves with regard to the signals across the force or pressure, respectively, applied to the deformable area. This can, for example, be used to increase an operating range of the sensor.

In one embodiment, bridge elements can be arranged at different radii of the membrane, which are differently bent, i.e. have a different tensile stress with the same pressure. Since the sensor elements lying further towards the inside experience a lower expansion, the same can further provide a contribution to the signal with large pressures.

Thereby, numerous possibilities for realizing a sensor with improved operating range result.

According to different embodiments, for example, in areas with high expansion, sensor elements of a first bridge can be arranged, while in areas with low expansion, for example closer to a symmetry point, further sensor elements of a second bridge can be arranged, each experiencing lower expansions with the same pressure on the deformable area.

Above that, according to some embodiments, sensor elements can be connected at different locations of an expansion, for example by serially connecting to a single overall sensor element, which has an extended operating range. Also, it is possible to arrange the sensor elements of a single bridge at areas of different expansion. If, for example, a sensor element at a location with high expansion and a sensor element at a location with low expansion are connected in one bridge branch, with low pressures, merely the sensor element at the location with high expansion experiences a change of resistance, while the sensor element at the location with low expansion only experiences a very low change of resistance, and thus actually acts as reference element. With average pressures, both sensor elements change their resistance, wherein, with increasing pressure, the one sensor element at the location with high expansion is saturated, so that, with high pressures, the sensor element at the location with high expansion experiences no change of resistance due to the saturation, and thus actually acts as reference resistor. Thus, by appropriate arrangement, it is possible to modify the output characteristic line, to compensate, for example, for non-linearities.

Another advantage of the above-mentioned arrangement of sensor elements at locations with different expansions is that the additional sensor elements can be used as test elements, for testing the function of the sensor elements at locations with high expansion.

According to some embodiments, the arrangement of sensor elements at locations with different expansions can be realized both for the above-described half bridge and the full bridge. Generally, the arrangement at locations with different expansions can be performed for any type of magnetostrictive sensor elements. For example, any bridge arrangement with any magnetization of a magnetically hard and magnetically soft layer can be realized additionally in a low distance to the center, so that basically a corresponding realization at locations with different expansions is possible for any possible magnetostrictive sensor arrangement.

With reference to FIGS. 1 to 7, different embodiments of the present invention will be discussed below. The same reference numbers in the respective figures designate similar elements of the different embodiments.

FIG. 1a shows the basic operating mode of a pressure sensor according to an embodiment. In a substrate 100, a thinly formed membrane 102 is implemented as mechanically deformable area, wherein the membrane has either a thinned integral portion of the substrate 100, for example an oxide layer, nitride layer or the same, wherein the substrate had been exposed from the back by etching, or an additionally deposited layer, which comprises, for example, silicon oxide, silicon nitride or polysilicon. The exposition of the membrane can also be performed from the front, wherein methods for the above-described processes are known and will not be discussed here in more detail. The substrate can comprise a semiconductor substrate, for example a silicon chip.

Figure 1C:
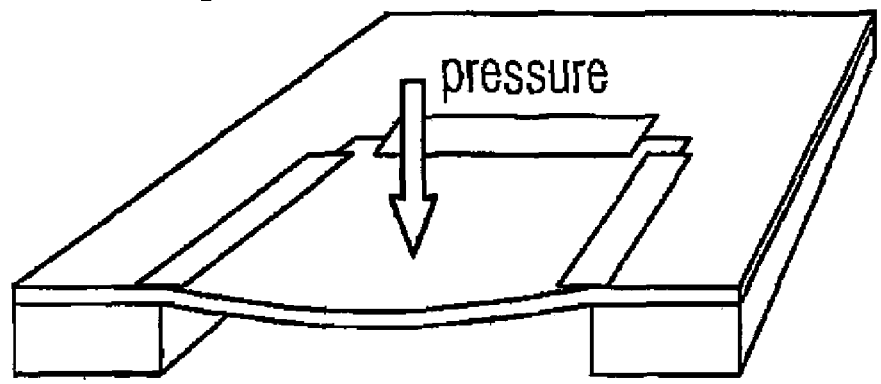

Force or pressure, respectively, is applied to the membrane 102, for example from the front side, and this causes deflection of the membrane. The stress curve results such that in the area of the membrane edges, which are designated by reference number A in FIG. 1b, tensile stresses occur on the top side, while compressive stresses occur in the center of the membrane, which is designated by reference number B. On the bottom side of the membrane, corresponding stresses with inverse signs occur. The stress maximum occurs at the membrane edges A, so that it is suitable and obvious to place the expansion-sensitive devices, whose signal can be used for measuring the pressure, are placed in the range of highest expansion, i.e. at the edge of the membrane, as indicated in FIG. 1c, for a sensor, for example, a pressure sensor.

Generally, the stress distribution of a membrane depends on the form of the same, wherein, however, in the above-mentioned membrane, a stress distribution is obtained, which is approximately running in a radial way, i.e. perpendicular to the edges of the membrane.

Figure 2A:
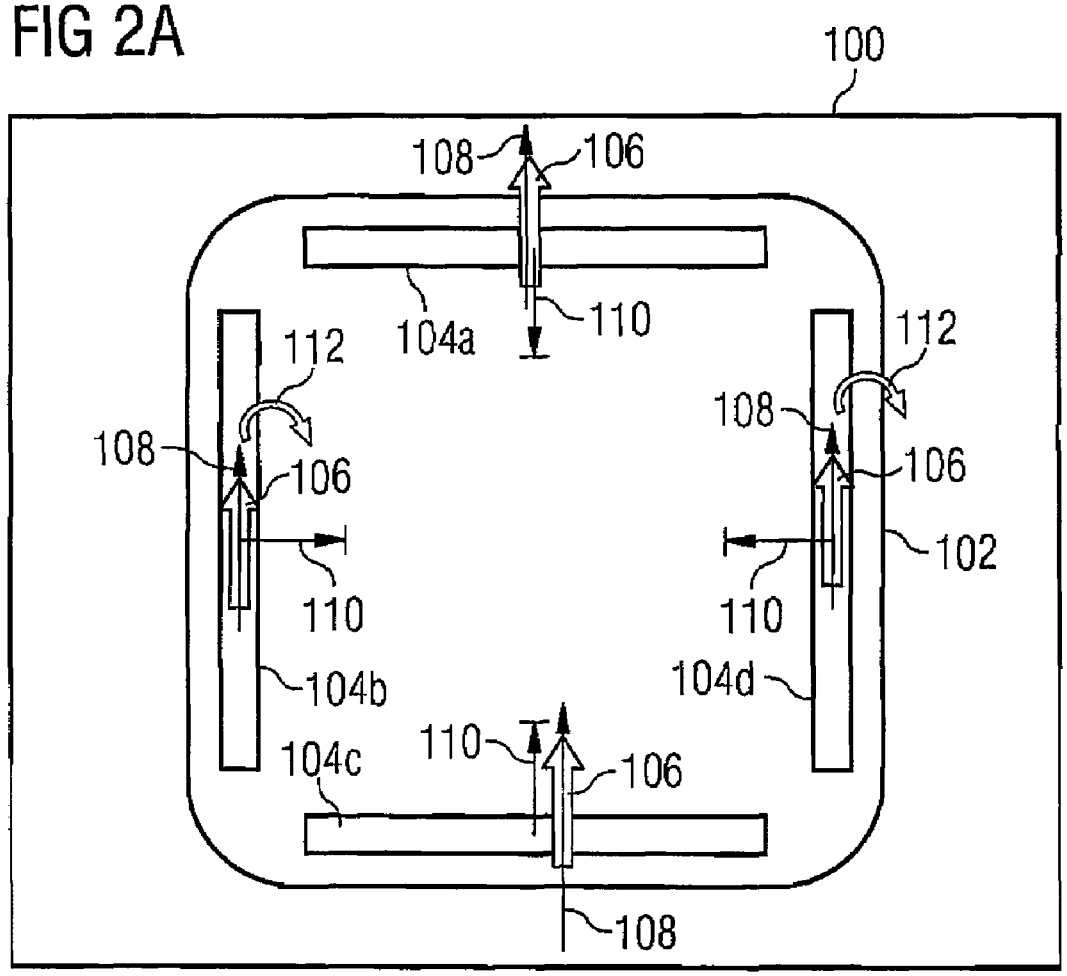
FIG. 2a is a top view on a sensor according to an embodiment.

Now, FIG. 2a shows an embodiment, where four sensor elements 104a, 104b, 104c and 104d are each arranged on the edge of the membrane 102, i.e. at the locations of a largest expansion. The sensor elements 104a-d are implemented as magnetostrictive multilayer sensor elements, and can, for example, comprise GMR or TMR sensor elements, which have a spin-valve arrangement with a magnetically hard layer and a magnetically soft layer. The sensor elements are implemented longitudinally, wherein a longitudinal axis of the sensor elements is in parallel to the sides of the membrane 102, which is substantially implemented in a square way.

In this embodiment, the magnetizations are such that the magnetically hard layer is aligned in parallel to the longitudinal axis of the sensor elements 104b and 104d, which act as measurement resistors, as will be discussed in more detail below. The alignment of the magnetizations can be obtained by a temper process under a magnetic field, wherein basically any angle can be adjusted in the plane.

The magnetically soft layer of the individual sensor elements 104a-d has a magnetic anisotropy, which is aligned in parallel to the magnetization direction of the hard layer, which can be adjusted, for example, by the growth conditions.

When applying an external pressure, the strips are expanded perpendicular to their longitudinal axis in an expansion direction 110. The sensor elements 104a-d can have magnetostrictive materials either with positive magnetostriction constant or negative magnetostriction constant.

In the case of magnetostrictive material with positive magnetostriction constant, a growing magnetic anisotropy is generated with increasing expansion in expansion direction. For energetic reasons, this leads to a rotation of polarization of the magnetically soft layer, as indicated in FIG. 2a by arrows with the reference number 112, in the sensor elements 104a and 104d acting as measurement resistors. Thereby, the resistance is increased in the sensor elements 104b and 104d, since the magnetization 108 of the magnetically soft layer is rotated away from the parallel alignment with the magnetization 106 of the magnetically hard layer, i.e. the magnetizations become more antiparallel. In the sensor elements 104a and 104c acting as reference resistors, the anisotropy generated by expansion is identical to the intrinsic anisotropy, so that every rotation of polarization of the magnetically soft layer from the original position would be energetically unfavorable. Thus, the magnetizations of the magnetically soft layer of the sensor elements 104a and 104c remain in their original alignment, so that the same show no expansion dependence.

In other words, by generating the magnetization of the magnetically soft layer of the sensor elements 104a and 104c acting as reference resistors, it can be effected in this embodiment that the same are subject to the same expansions as the sensor elements 104b and 104d, but without experiencing a change of the electric resistance. Thereby, a change of the characteristics of the sensor elements effected with increasing lifespan of the sensor is generated due to a frequent expansion and contraction both in the reference resistors 104a and 104c and in the measurement resistors 104b and 104d. Both the reference resistors and the measurement resistors have the same longtime drift, so that, for example, expensive drift compensation circuits can be omitted and a cost effective sensor with high sensitivity can be realized.

Figure 2B:
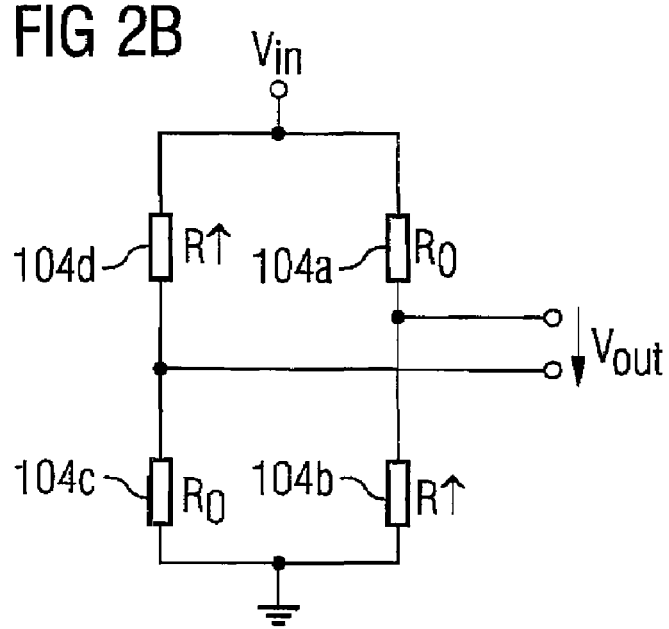

FIG. 2b shows a connection of the sensor elements 104a-d shown in FIG. 2a. The sensor elements are connected to a Wheatstone bridge, wherein one measurement resistor and one reference resistor each are arranged in every branch of the bridge. Thereby, the measurement resistors and the reference resistors in both branches are oppositely arranged, so that the measurement resistor of the first branch, i.e. for example the sensor element 104b, and the reference resistor of the second branch, i.e. for example the sensor element 104c, are connected to a first voltage node, while the reference resistor 104a of the first branch and the measurement resistor 104d of the second branch are connected to a second voltage node. A voltage is tapped between the respective sensor elements of one branch, which provides an output signal, which indicates the pressure responsible for the deformation of the membrane or the force acting on the membrane 102, respectively. Thus, the connection to a half bridge, as shown in FIG. 2b, provides an output voltage with low offset and drift, wherein a maximum sensor signal of those sensor elements is obtained due to the perpendicular alignment of the magnetically soft layer of the sensor element 104b and 104d.

As has already been explained above, this embodiment has the particular advantage that both the magnetization of the magnetically soft layer and the magnetizations of the magnetically hard layer are the same for all sensor elements 104a-d, so that during production a simple magnetization is possible in a single magnetization step. Thereby, as explained above, a maximum output signal is obtained by the arrangement of the magnetically soft layer perpendicular to the expansion direction.

Now, with reference to FIG. 3a, a further embodiment will be discussed. The embodiment illustrated in FIG. 3a differs from the embodiment illustrated in FIG. 2a in that the magnetizations of the magnetically soft layer and the magnetically hard layer for each of the sensor elements are not parallel, but have an angle unequal 0°. In the embodiment shown in FIG. 3a, the magnetizations of magnetically hard and magnetically soft layer 106 and 108 are perpendicular to each other. Thereby, the magnetizations of the magnetically hard layer of the sensor elements 104a and 104d have an angle of 135° with regard to the expansion direction 110, while the magnetizations 106 of the magnetically hard layer of the sensor elements 104b and 104c have an angle of 45° with regard to the expansion direction 110. Further, due to the perpendicular alignment of the magnetization of the magnetically hard layer and the magnetically soft layer, the magnetizations 108 of the magnetically soft layer of the sensor elements 104a and 104b have an angle of 135° with regard to the expansion direction 110, while the magnetizations of the magnetically soft layer of the sensor elements 104c and 104d have an angle of 45° with regard to the expansion direction 110.

Due to the above-mentioned arrangement, in the case of magnetostrictive materials with positive magnetostriction in expansion direction, a magnetic anisotropy is generated, which grows with increasing expansion, which has the effect that due to energetic reasons, the polarization of the soft layer of the sensor elements 104a and 104c becomes increasingly parallel, and thus experiences a decrease of resistance, while the magnetizations of the sensor elements 104b and 104d become increasingly antiparallel due to the generated pressure and thus experience an increase of resistance.

The particular advantage of this embodiment results from the fact that a full bridge circuit is enabled, wherein all sensor elements have both a magnetization of the magnetically hard layer and a magnetization of the magnetically soft layer, each in a predetermined direction. Thereby, in a production process, the magnetization of the magnetically hard layer can be generated for all sensor elements in a single step, and the magnetization of the magnetically soft layer for all sensor elements can be generated also in a single method step. The arrangement of the magnetizations of the magnetically soft and the magnetically hard layer perpendicular to each other has the advantage that a high slope is obtained at 90° due to the cosine-shaped dependence, so that the change of the resistance is high due to a rotation of the magnetization of the magnetically soft layer.

Figure 3A:
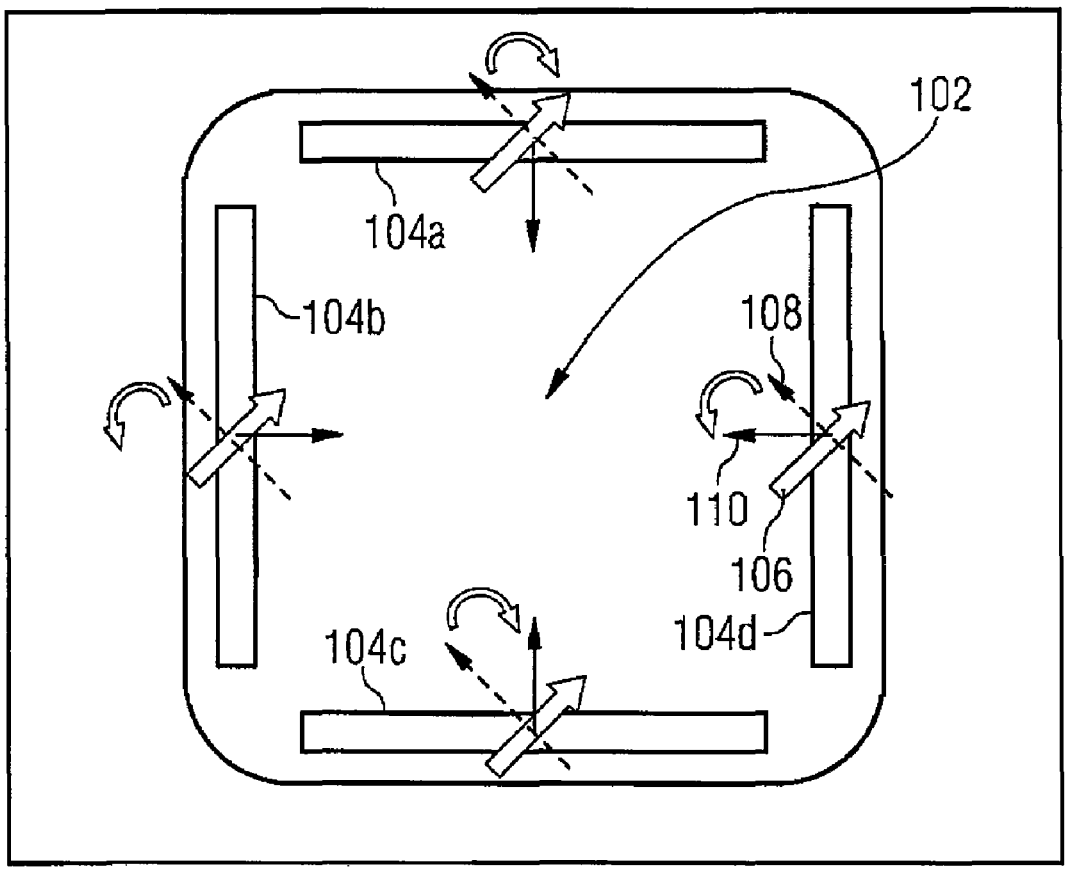
FIG. 3a is a schematic top view of a sensor according to a further embodiment.
Figure 3B:
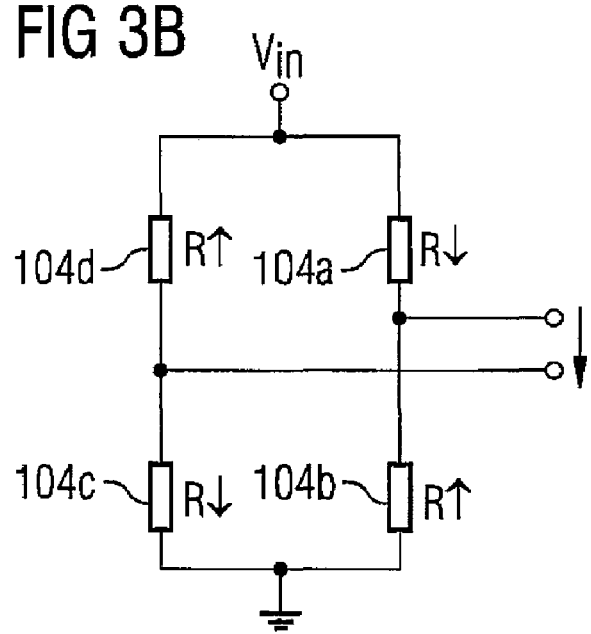

FIG. 3b shows a connection of the sensor shown in FIG. 3a into a full bridge. In a first branch, two resistors 104a and 104b with opposite change of the electric resistance are arranged, while in a second branch also two sensor elements 104d and 104c with opposite change of the electric resistance are arranged. The sensor elements are each oppositely arranged in the respective branches, so that the sensor elements 104b, with increasing resistance of the first branch, and the sensor element 104c, with decreasing resistance of the second branch, are each connected to a first voltage node, while the sensor element 104a of the first branch with decreasing resistance and the sensor element 104d of the second branch with increasing resistance are connected to a second voltage node. Corresponding to the circuit configuration shown in FIG. 2b, a sensor signal is generated by tapping a voltage signal between the sensor elements of the respective branches.

Figure 4:
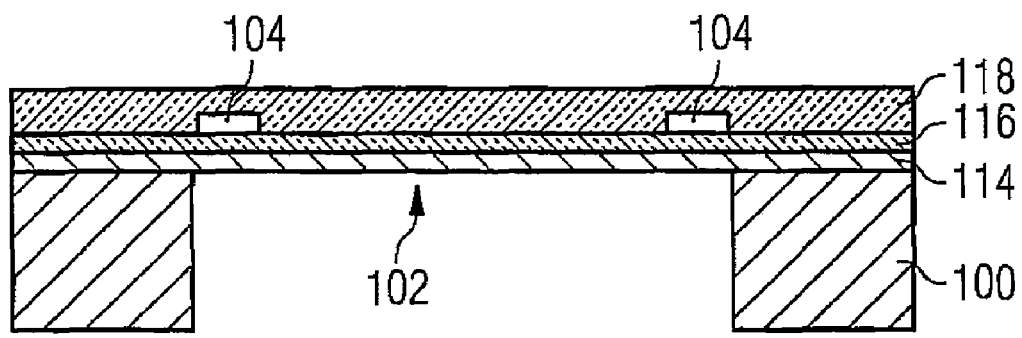
FIG. 4 is a schematic cross-sectional illustration of a sensor according to an embodiment.
Figure 5:
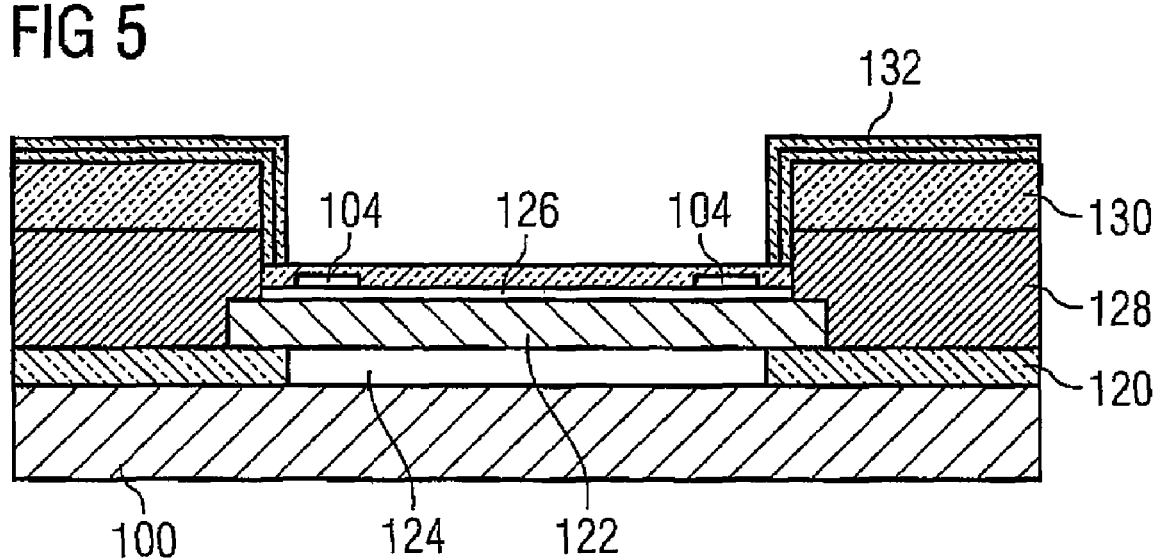
FIG. 5 is a schematic cross-sectional illustration of a sensor according to a further embodiment.

With reference to FIGS. 4 and 5, embodiments of a realization of the sensors shown in the figures will be discussed below. More precisely, FIG. 4 shows a structure of a magnetostrictive pressure sensor in BMM silicon technology, while FIG. 5 shows a schematic structure of a magnetostrictive pressure sensor in SMM technology.

According to FIG. 4, the substrate 100 is exposed from the back, so that the deflectable membrane 102 is formed in a predetermined area, which is defined by the exposed recess on the back. As can be seen in FIG. 4, the membrane 102 comprises a thin layer 114 of semiconductor material of the substrate, whereon a further thin insulation layer 116 is formed. The sensor elements 104, i.e. the GMR/TMR resistor structures are formed on the insulation layer, which are arranged in the area of a maximum expansion. A further passivation layer 118 is deposited on the insulation layer 116, which protects the sensor elements 104 from environmental influences.

In the SMM structure shown in FIG. 5, a sacrificial layer 120 is formed on the substrate 100, which has a recess in a predetermined area, which defines the area of the membrane. The sacrificial layer can be formed, for example, of silicon oxide, and can have a thickness of about 0.5 μm. A membrane layer 122 is formed on the sacrificial layer 120 at the edges of the same, which extends across the recess of the sacrificial layer 120, so that a cavity 124 is formed between the membrane layer 122 and the substrate 100. The recess of the sacrificial layer, which forms the cavity, can be generated by local selective etching of the sacrificial layer. The membrane layer 122 can be formed, for example, of polycrystalline silicon, and can have a thickness of about 0.5 to 1 μm. A thin insulation layer 126 is deposited on the membrane, wherein the GMR/TMR structures 104 are placed in the area of strongest expansion. Further, an intermetal oxide layer 128 is deposited on the sacrificial layer 120, on which again a chip passivation layer 130 is formed. The intermetal oxide layer 128 and the chip passivation layer 130 are etched away over the sensor membrane 122, to allow sufficient movement of the membrane. For protecting the sensor elements 104, the sensor is coated with a passivation layer 132, which extends across the whole structure on the full area.

Figure 6A:
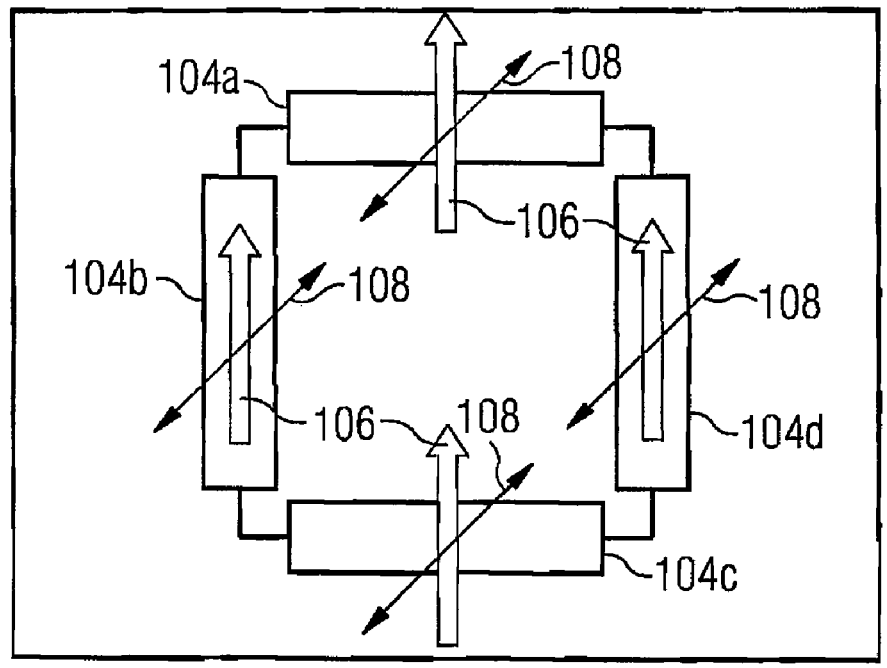
FIG. 6a is a schematic top view on a sensor according to a further embodiment.
Figure 6B:
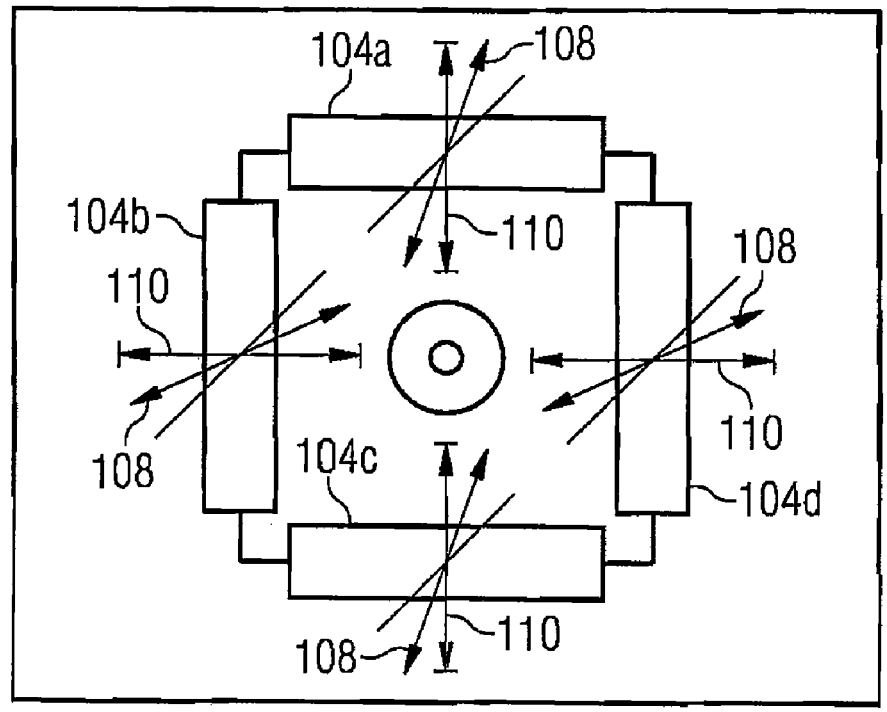
FIG. 6b is a schematic top view on the sensor according to FIG. 6a during pressurization.

With reference to FIGS. 6a and 6b, a further embodiment of a full bridge circuit will be explained below, where, in contrary to the embodiment shown in FIGS. 3a and 3b, the magnetizations of the magnetically hard layer and the magnetizations of the magnetically soft layer for the respective sensor elements 104a-d are not perpendicular to each other. More precisely, in this embodiment, the magnetizations of the magnetically hard layer and the magnetically soft layer have an angle of 45°, which has the advantage that the resulting characteristic curve of the signal across the stress or the pressure, respectively, is linear and symmetrical to the operating point. In FIG. 6a, as in FIG. 3a, the magnetization of the reference layer 106 can be seen as thick arrows. Above that, the axis of the easy magnetization or easy direction in the measurement layer, respectively, can be seen as double arrows, which corresponds to reference number 108 in FIG. 3a. All further reference numbers 101-104 can be seen from FIG. 3.

FIG. 6a shows the sensor for the case without deformation of the membrane 102, where it can be seen that the magnetizations of the magnetically hard layer and the magnetically soft layer have an angle of 45°. Corresponding to the embodiment shown with reference to FIG. 3a, all magnetizations of the magnetically soft layer as well as of the magnetically hard layer are generated in the same direction, whereby the already explained advantages of a simplified production of the sensor can be obtained, due to generating a magnetization for all sensor elements. As has already been described above, this is obtained in that the magnetically hard layer, i.e. the reference layer, is magnetized such that the magnetization of all sensor elements points in the same direction. Different methods can be used, for example an AAF-pinned AAF (AAF=Artificial Anti-Ferromagnet) or a pinned individual layer. Obtaining magnetization of all sensor elements in the same direction can be very easily obtained by applying a sufficiently large external magnetic field, which can be performed, for example at an increased temperature. Further, it is required that the preferential direction in the measurement layer is below an angle to the magnetization of the reference layer, wherein an angle of 45° is to be preferred due to the above-mentioned advantages.

When a force acts on the membrane 102, the stress distribution shown in FIG. 6b results in a radial way, i.e. the expansion directions are perpendicular to the sides of the membrane 102 implemented in a square way. If a positive sign of magnetostriction is selected for the measurement layer, the magnetization will preferably rotate in the direction of the tensile stress, i.e. the angle between a magnetization of the magnetically soft layer and the expansion direction a decreases. Thereby, the angle between the magnetization of the reference layer and the magnetization of the measurement layer changes correspondingly by the angle $\alpha=|\phi_0-\sigma|$, wherein $\phi_0$ is the angle without deformation of the membrane. Since the resistance in magneto-resistive resistor elements depends on the angle between the magnetization and the reference layer and the measurement layer, the value R of every individual resistor changes correspondingly by an amount $\Delta R$. By a dedicated connection to a bridge corresponding to the embodiment shown in FIG. 3b, all mentioned advantages result, for example a compensation of temperature drift, wherein the full magnetic signal is available due to the arrangement of the resistors.

Thus, in summary, it can be said that in this particular embodiment, the easy direction of the measurement layer and the magnetization of the reference layer are arranged below 45° to each other, which has the advantage that a rotation of the easy axis in the measurement layer in relation to the reference magnetization results, both with tensile stress and with compressive stress. The case under tensile stress perpendicular to the resistor elements is shown in FIG. 6b. The magnetization of the measurement layer follows the tensile stress (positive magnetostriction) and rotates from the 45° direction to, for example, 20° in elements 104b and 104d or 70° in elements 1404a and 104c, respectively. This means the resistance decreases in the elements 104a and 104c, since here a higher parallel alignment exists between measurement layer and reference layer, and increases in the elements 104d and 104b, since here a lower parallel alignment exists between measurement layer and reference layer.

A correspondingly opposite behavior results when compressive stress acts perpendicular to the elements, which can be equated with an analog tensile stress along the elements. Again, the easy axis of magnetization of the measurement layer rotates along the tensile stress, and the effect is reversed. If 45° is selected as starting point, it will be possible to rotate the magnetization by 45° in the one or other direction, respectively, under pressure and under tensile stress. Since the maximum swing, or angle rotation, respectively, that can be obtained by stress, is 90°, there is a symmetrical operating range for tensile stress and pressure in the case of a 45° alignment. All angles unequal to 45° would limit the operating range, since the resistors would not change in an opposite way, which would lead to a nonlinear bridge signal. In the extreme case, e.g. 0°, the two elements 104b and 104d would be no longer sensitive to the applied tensile stress. The full bridge becomes a half bridge, with only half the sensitivity. All angles between 0 and 45° allow a full bridge, but, as has already been described above, only an arrangement with 45° has a symmetrical operating point.

For improving sensor linearity, additional resistances can be disposed at locations having different amounts of compressive stresses.

In that regard, for example, FIG. 7 shows an embodiment where additional sensor elements 134a-d are disposed in a radially symmetric way to the center further inside on the membrane 102. The inner sensor elements 134a-d are connected to a bridge, like the external sensor elements 104a-d, wherein the inner bridge is implemented such that the same still provide a contribution to the signal, even after saturation of the external bridge elements at high pressures. FIG. 7 shows such a state, where the magnetizations of the magnetically soft layer of the sensor elements 104a-d are already adjusted in parallel to the expansion direction due to the high pressure applied to the membrane 102, so that the sensor elements 104a-d are already saturated. The sensor elements 134a-d are not yet saturated, due to their arrangement closer to the center, i.e. at locations of lower mechanical deformation, which can be detected in FIG. 7 due to the fact that the magnetizations 108 of the magnetically soft layer of the sensor elements 134a-d are not yet parallel to the expansion direction, i.e. have an angle unequal 0.

Although the present embodiments have been described with sensor elements having a positive magnetostriction, further embodiments can also comprise sensor elements with negative magnetostriction, wherein a correspondingly altered magnetization of the magnetically hard layer and the magnetically soft layer is to be selected with regard to the expansion direction or arrangement of the measurement and reference resistor, respectively.

The mode of operation of the sensors with negative magnetostriction constant remains unaffected. In a full bridge, only the changes of resistances of two bridge resistors are exchanged, i.e. the resistance getting higher with positive materials, gets smaller with negative materials and vice versa. In the half bridge, the reference resistor becomes a measurement resistor and vice versa. Basically, there are no changes in the directions of magnetization.

Further, in other embodiments, the sensors described in the embodiments can be modified in that a negative extension, i.e. magnetostriction, occurs at the location of sensor elements. Thus, the sensor elements can be arranged both at locations with positive expansion and at locations with negative expansion.

Further, the preferred embodiments describe an application of the sensor as pressure sensor, wherein the mechanically deformable area is a membrane. However, the present invention is not limited to such sensors, and can, for example, also comprise an application for detecting accelerations, for example, in that an acceleration or test mass is connected to the substrate via thin ridges.

Preferably, the sensor elements described in the embodiments are similar, i.e. they have the same layer structure, the same materials and the same form and thus the same magnetostriction coefficient. However, realizations are possible, where different sensor elements are used with regard to the above characteristics.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A sensor, comprising:
    a substrate;
    a mechanically deformable area formed in the substrate; and
    a first magnetostrictive multilayer sensor element and a second magnetostrictive multilayer sensor element, each arranged at least partly in the mechanically deformable area, wherein the first magnetostrictive multilayer sensor element and the second magnetostrictive multilayer sensor element are connected to each other and implemented such that, when generating a mechanical deformation of the mechanically deformable area, (1) the electric resistance of the first magnetostrictive multilayer sensor element changes in opposition to the electric resistance of the second magnetostrictive multilayer sensor element, or (2) the electric resistance of the first magnetostrictive multilayer sensor element remains unchanged and the electric resistance of the second magnetostrictive multilayer sensor element changes, wherein the first and second magnetostrictive multilayer sensor elements are spin-valve sensor elements and a magnetization of the magnetically hard layer of the first sensor element and the second sensor element have the same direction.

2. The sensor according to claim 1, wherein a magnetization of the magnetically soft layer of the first sensor element and the second sensor element point to the same direction without mechanical deformation of the mechanically deformable area.

3. The sensor element according to claim 1, wherein the magnetization of the magnetically soft layer without mechanical deformation of the mechanically deformable area and an expansion direction, which would each result at the location of the first and second sensor elements when a force is applied to the mechanically deformable area, each have an angle of 45°, 90° or 135° for the first and second sensor elements.

4. The sensor element according to claim 1, wherein an angle between the magnetization of the magnetically soft layer of the first sensor element without mechanical deformation of the mechanically deformable area and an expansion direction, which would result at the location of the first sensor element when a force is applied to the mechanically deformable area, has a value of 0° or 180°.

5. The sensor element according to claim 1, wherein, without mechanical deformation of the mechanically deformable area, the magnetization of the magnetically hard layer and the magnetization of the magnetically soft layer of each of the first sensor element and the second sensor element are adjusted such that they have an angel of 45°, 90° or 135°.

6. The sensor element according to claim 1, wherein the magnetization of the magnetically hard layer and an expansion direction, which would result at the location of the first and second sensor elements when a force is applied to the mechanically deformable area, each have an angle of 0°, 45°, 90°, 135° or 180° for the first and second sensor elements.

7. The sensor according to claim 1, wherein the first sensor element and the second sensor element have a positive magnetostriction coefficient.

8. The sensor according to claim 1, wherein the first sensor element and the second sensor element have a negative magnetostriction coefficient.

9. The sensor according to claim 1, wherein the mechanically deformable area has a symmetry point, wherein the first sensor element and the second sensor element have the same distance from the symmetry point.

10. The sensor according to claim 1, wherein the mechanically deformable area is implemented in a square or round way, wherein the first sensor element is arranged along a first portion of the mechanically deformable area, and the second sensor element is arranged along a portion adjacent to the portion of the mechanically deformable area.

11. The sensor according to claim 1, wherein the first sensor element and the second sensor element are sensor elements of a branch of a bridge circuit.

12. The sensor according to claim 11, wherein a third sensor element, which corresponds to the first sensor element, and a fourth sensor element, which corresponds to the second sensor element, are connected to each other in a further branch of the bridge.

13. The sensor according to claim 11, wherein the resistances of the sensor elements change differently within a bridge branch under mechanical stress.

14. The sensor according to claim 1, wherein a further sensor element is located at a location in the mechanically deformable area, which has a deformation when a force is applied to the mechanically deformable area, which differs from a deformation at the location of the first sensor element or the second sensor element.

15. The sensor according to claim 14, wherein the mechanically deformable area has a symmetry point, wherein the further sensor element has a first distance to the symmetry point, while the first and second sensor elements each have a distance to the symmetry point differing from the first distance.

16. The sensor according to claim 14, wherein a plurality of further sensor elements are arranged in the mechanically deformable area, wherein the plurality of further sensor elements are arranged at locations, which have a deformation, when pressure is applied to the mechanically deformable area, which differs from a deformation at the location of the first sensor element and the second sensor element.

17. The sensor according to claim 16, wherein the plurality of further sensor elements are connected to a bridge.

18. A method for producing a sensor, comprising:
generating a mechanically deformable area in a substrate;
generating a first magnetostrictive multilayer sensor element and a second magnetostrictive multilayer sensor element, each at least partly in the mechanically deformable area, wherein the same are implemented such that, when generating a mechanical deformation of the of the mechanically deformable area, (1) the electric resistance of the first magnetostrictive multilayer sensor element changes in opposition to the electric resistance of the second magnetostrictive multilayer sensor element, or (2) the electric resistance of the first magnetostrictive multilayer sensor element remains unchanged and the electric resistance of the second magnetostrictive multilayer sensor element changes, wherein the first and second magnetostrictive multilayer sensor elements are spin-valve sensor elements and a magnetization of the magnetically hard layer of the first sensor element and the second sensor element have the same direction; and
connecting the first magnetostrictive multilayer sensor element and the second magnetostrictive multilayer sensor element.

19. The method according to claim 18, wherein the step of generating first and second magnetostrictive sensor elements comprises generating first and second spin-valve sensor elements.

20. The method according to claim 19, wherein the step of generating the first and second sensor elements comprises of aligning the magnetization of the magnetically hard layer of the first sensor element and the second sensor element in the same direction.

21. The method according to claim 19, wherein the step of generating the first and second sensor elements comprises aligning, so that the magnetization of the magnetically soft layer without mechanical deformation of the mechanical deformable area and an expansion direction, which would each result at the location of the first and second sensor elements when a force is applied to the mechanically deformable area, each have an angle of 45°, 90° or 135° the first and second sensor elements.

22. The method according to claim 19, wherein the step of generating the first and second sensor elements comprises aligning, so that an angle between the magnetization of the magnetically soft layer of the first sensor element without mechanically soft layer of the first sensor element without mechanical deformation of the mechanically deformable area and an expansion direction, which would result at the location of the first sensor element when a force is applied to the mechanically deformable area, has a value of 0° or 180°.

23. The method according to claim 19, wherein the step of generating the first and second sensor element comprises aligning, so that without mechanical deformation of the mechanically deformable area, the magnetization (of the magnetically hard layer and the magnetization of the magnetically soft layer of each of the first sensor element and the second sensor element are adjusted such that they have and angle of 45°, 90° or 135°.

24. The method according to claim 18, wherein the magnetization of the magnetically hard layer and an expansion direction, which would result at the location of the first and second sensor elements when a force is applied to the mechanically deformable area, each have an angle of 0°, 45°, 90°, 135° or 180° for the first and second sensor elements.

* * * * *